United States Patent
Uziel et al.

(10) Patent No.: US 11,792,665 B2
(45) Date of Patent: Oct. 17, 2023

(54) SIDELINK CHANNEL SELECTION COORDINATION

(71) Applicant: QUALCOMM Incorporated, San Diego, CA (US)

(72) Inventors: Lior Uziel, Hod Hasharon (IL); Cheol Hee Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 17/313,953

(22) Filed: May 6, 2021

(65) Prior Publication Data

US 2022/0361014 A1    Nov. 10, 2022

(51) Int. Cl.
*H04W 24/08* (2009.01)
*H04B 17/318* (2015.01)
*H04W 4/40* (2018.01)
*H04W 72/044* (2023.01)

(52) U.S. Cl.
CPC .......... *H04W 24/08* (2013.01); *H04B 17/318* (2015.01); *H04W 4/40* (2018.02); *H04W 72/044* (2013.01)

(58) Field of Classification Search
CPC ........ H04L 12/28; H04W 24/08; H04W 4/40; H04W 72/044; H04B 17/318
USPC ....................... 370/329, 395, 401
See application file for complete search history.

(56) References Cited

U.S. PATENT DOCUMENTS

| 2017/0238304 | A1  | 8/2017 | Ling et al. |
| 2018/0279096 | A1  | 9/2018 | Wu et al. |
| 2021/0105055 | A1* | 4/2021 | Chae ............ H04L 1/0026 |
| 2021/0144570 | A1* | 5/2021 | Chae ............ H04L 5/0048 |

FOREIGN PATENT DOCUMENTS

| EP | 3316657 A1 | 5/2018 |
| WO | 2020033422 A1 | 2/2020 |

OTHER PUBLICATIONS

International Search Report and Written Opinion—PCT/US2022/071644—ISA/EPO—dated Nov. 15, 2022.
Interdigital, et al., "Discussion on Range Requirement and CBR/CR in NR V2X", 3GPP TSG RAN WG1 Ad-hoc Meeting 1901, R1-1900770 (R16 NR V2X WI AI7244 QOS), 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019, XP051593616.

(Continued)

*Primary Examiner* — Dang T Ton
(74) *Attorney, Agent, or Firm* — Patterson + Sheridan, L.L.P.

(57) ABSTRACT

Certain aspects of the present disclosure provide techniques for sidelink (SL) channel selection coordination. A method that may be performed by a user equipment (UE) includes measuring, during a time period shorter than one slot, a channel condition of at least one first channel in a sidelink (SL) frequency band. The method further includes transmitting a signal on the at least one first channel or a second channel of the SL frequency band, wherein the at least one first channel or the second channel is chosen based on the channel condition.

22 Claims, 11 Drawing Sheets

(56) References Cited

OTHER PUBLICATIONS

ITRI: "Discussion on NR Sidelink Mode 2 Resource Allocation Mechanism", 3GPP TSG RAN WG1 #98, R1-1908888, 3rd Generation Partnership Project, Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 16, 2019, 9 Pages, XP051765496.
Partial International Search Report—PCT/US2022/071644—ISA/EPO—dated Aug. 8, 2022.
SONY: "Considerations on Sidelink Physical Layer Measurement for NR V2X", 3GPP TSG-RAN WG1 #94bis, R1-1811448, 3rd Generation Partnership Project, Mobile Competence Centre, 650, Route Des Lucioles, F-06921 Sophia-Antipolis Cedex, France vol. RAN WG1, No. Chengdu, China, Oct. 8, 2018-Oct. 12, 2018, 2 Pages, Sep. 28, 2018, XP051518851.

* cited by examiner

SIDELINK CHANNEL SELECTION COORDINATION

INTRODUCTION

Aspects of the present disclosure relate to wireless communications, and more particularly, to techniques for sidelink communication (e.g., cellular vehicle to everything (CV2X) communication).

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages.

Certain aspects of the subject matter described in this disclosure can be implemented in a method for wireless communication by a user equipment (UE). The method generally includes measuring, during a time period shorter than one slot, a channel condition of at least one first channel in a sidelink (SL) frequency band. The method further includes transmitting a signal on the at least one first channel or a second channel of the SL frequency band, wherein the at least one first channel or the second channel is chosen based on the channel condition.

Certain aspects of the subject matter described in this disclosure can be implemented in a method for wireless communication by a centralized entity. The method generally includes receiving an indication of a channel condition of at least one first channel in a sidelink (SL) frequency band, wherein the channel condition is determined for a time period shorter than one slot. The method further includes transmitting a switch message to a group of user equipments (UEs) directing the group of UEs to switch to using the at least one first channel for SL communications between the UEs included in the group.

Certain aspects of the subject matter described in this disclosure can be implemented in an apparatus in a wireless communications system. The apparatus generally includes a memory and a processor coupled to the memory. The memory and the processor are configured to measure, during a time period shorter than one slot, a channel condition of at least one first channel in a sidelink (SL) frequency band. The processor and memory are further configured to transmit a signal on the at least one first channel or a second channel of the SL frequency band, wherein the at least one first channel or the second channel is chosen based on the channel condition.

Certain aspects of the subject matter described in this disclosure can be implemented in an apparatus in a wireless communications system. The apparatus generally includes a memory and a processor coupled to the memory. The memory and the processor are configured to receive an indication of a channel condition of at least one first channel in a sidelink (SL) frequency band, wherein the channel condition is determined for a time period shorter than one slot. The processor and memory are further configured to transmit a switch message to a group of user equipments (UEs) directing the group of UEs to switch to using the at least one first channel for SL communications between the UEs included in the group.

Certain aspects of the subject matter described in this disclosure can be implemented in an apparatus for wireless communication. The apparatus generally includes means for measuring, during a time period shorter than one slot, a channel condition of at least one first channel in a sidelink (SL) frequency band. The apparatus further includes means for transmitting a signal on the at least one first channel or a second channel of the SL frequency band, wherein the at least one first channel or the second channel is chosen based on the channel condition.

Certain aspects of the subject matter described in this disclosure can be implemented in an apparatus for wireless communication. The apparatus generally includes means for receiving an indication of a channel condition of at least one first channel in a sidelink (SL) frequency band, wherein the channel condition is determined for a time period shorter than one slot. The apparatus further includes means for transmitting a switch message to a group of user equipments (UEs) directing the group of UEs to switch to using the at least one first channel for SL communications between the UEs included in the group.

Certain aspects of the subject matter described in this disclosure can be implemented in a computer-readable medium for wireless communication. The computer-readable medium stores computer-executable code that, when executed by a processing system, causes the processing system to perform operations that generally include measuring, during a time period shorter than one slot, a channel condition of at least one first channel in a sidelink (SL)

frequency band. The operations further include transmitting a signal on the at least one first channel or a second channel of the SL frequency band, wherein the at least one first channel or the second channel is chosen based on the channel condition.

Certain aspects of the subject matter described in this disclosure can be implemented in a computer-readable medium for wireless communication. The computer-readable medium stores computer-executable code that, when executed by a processing system, causes the processing system to perform operations that generally include receiving an indication of a channel condition of at least one first channel in a sidelink (SL) frequency band, wherein the channel condition is determined for a time period shorter than one slot. The operations further include transmitting a switch message to a group of user equipments (UEs) directing the group of UEs to switch to using the at least one first channel for SL communications between the UEs included in the group.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for frequency channel selection coordination by devices of a sidelink (SL) communication system. Example SL communications systems include CV2X communications systems. Though certain aspects may be discussed with respect to CV2X communications in a CV2X communications system, it should be noted that the aspects may equally apply to other suitable types of SL communications systems. In certain aspects, the SL communications occur within an unlicensed spectrum. An unlicensed spectrum refers to any frequency band(s) that are not subject to licensed use under regulatory practice, such that they are open to use by any devices, and not just devices that have a license to use the particular frequency band(s). In certain aspects, SL communications occur within a licensed band.

Some frequency channels (also referred to as SL frequency channels) of a frequency band (also referred to as a SL frequency band) available for use for SL communications may contain interference from one or more other types of communications systems (e.g., dedicated short-range communications (DSRC) and/or Wi-Fi) and/or non-communications systems (e.g., radar) operating in a similar geographical area as the SL communication system. The interference may cause performance degradation for devices performing SL communications in the affected frequency channels.

Figure 3A:
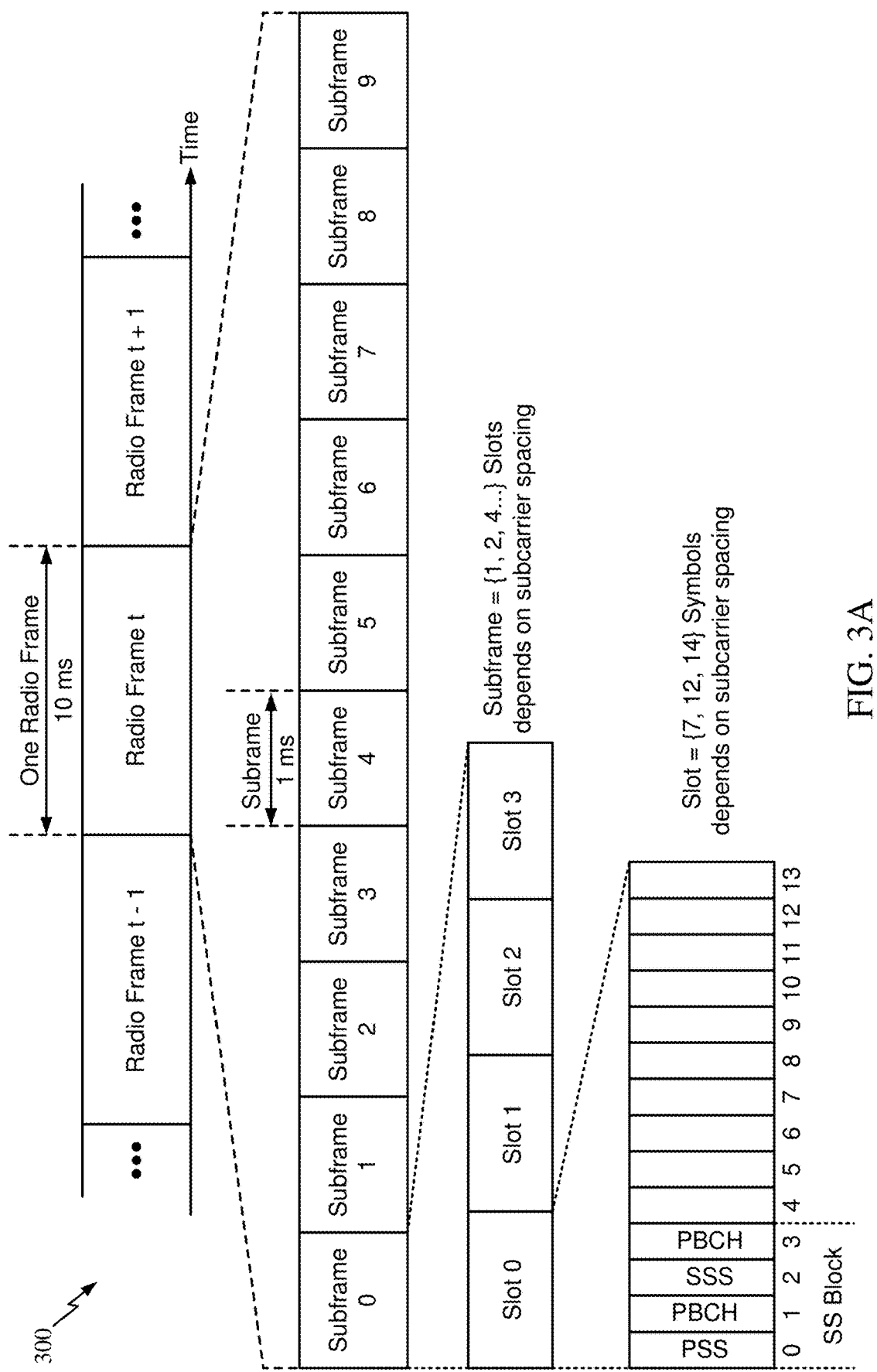
FIG. 3A is an example frame format for certain wireless communication systems (e.g., new radio (NR)), in accordance with certain aspects of the present disclosure.

In certain aspects, devices of a SL communication system are configured to communicate using a particular frame format (e.g., that occurs periodically, such as the frame format of FIG. 3A described herein). For example, a frame according to the frame format may be divided in time into a plurality of time periods, such as subframes. Each subframe may further be divided in time into one or more slots. Each slot may further be divided in time into a plurality of symbols.

In certain aspects, interference on a SL frequency channel may occur over a relatively short time period, such as for a time period having a duration shorter than one slot. Accordingly, though there may be interference on a portion of the slot, there may not be interference present on the remainder of the slot (e.g., one or more symbols). Therefore, the duration of time (e.g., one or more symbols) corresponding to the remainder of the slot may be available for SL communication.

In one or more aspects of the present disclosure, a device may measure (also referred to as sense) channel conditions in one or more SL frequency channels during a short time period, such as a time period shorter than one slot, to determine whether to use the one or more SL frequency channels for SL communications. When the device measures channel conditions on an SL frequency channel indicating that interference is below a threshold (e.g., when the device measures energy levels on the SL frequency channel below a threshold, when a receive signal strength indicator (RSSI) as measured on the SL frequency channel is below a threshold), the device may determine the SL frequency channel is available for communication. When the device measures channel conditions on an SL frequency channel indicating that interference is above a threshold (e.g., when the device measures energy levels on the SL frequency channel above a threshold, when a RSSI as measured on the SL frequency channel is above a threshold), the device may determine the SL frequency channel is not available for communication. By measuring a SL frequency channel for a short time period, the device may find the SL frequency channel is available for communication, when it may not have if a longer time period was measured (e.g., an entire slot).

In some aspects, the short period of time corresponds to a period of time shorter than a slot. In some aspects, the short period of time may correspond to a single symbol. In some aspects, the short period of time may correspond to a single symbol containing a reference signal (e.g., CV2X reference signal). In some aspects, measuring the channel refers to measuring a RSSI of the SL frequency channel. Accordingly, in certain aspects where a short period of time is used for measuring an SL frequency channel, latency of communications may be reduced, as devices are more quickly able to use the SL frequency channel for communication. In certain aspects where a short period of time is used for measuring an SL frequency channel, throughput of communications may be increased, as devices are more often able to use the SL frequency channel for communication.

It should be noted that though certain aspects are described herein with respect to measuring a SL frequency channel for a period of time shorter than a slot, certain aspects may be applicable to measurements of a SL frequency channel over a longer period of time, such as equal to or greater than a slot.

In some aspects of the present disclosure, devices may be assigned to a group, and a centralized entity (e.g., a network entity, base station, server, etc.) may determine that the group of devices should change to a new channel for performing C SL communications. For example, the devices may send information regarding channel measurements to the centralized entity (CE) (e.g., via one or more base stations, road side units, etc.), which uses the information to determine groups of devices and assign them frequency channels to use for SL communications. In certain aspects, switching a group of devices to a new channel together can reduce signaling needed. In certain aspects, switching a group of device to a new channel can increase throughput over the SL frequency channels, reduce packet error rate, and/or reduce latency/delay in communications.

Though certain aspects are discussed with respect to SL communications, the aspects may similarly be applicable to any suitable type of device to device communications.

The following description provides examples of channel selection coordination by devices in SL communications systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Figure 1:
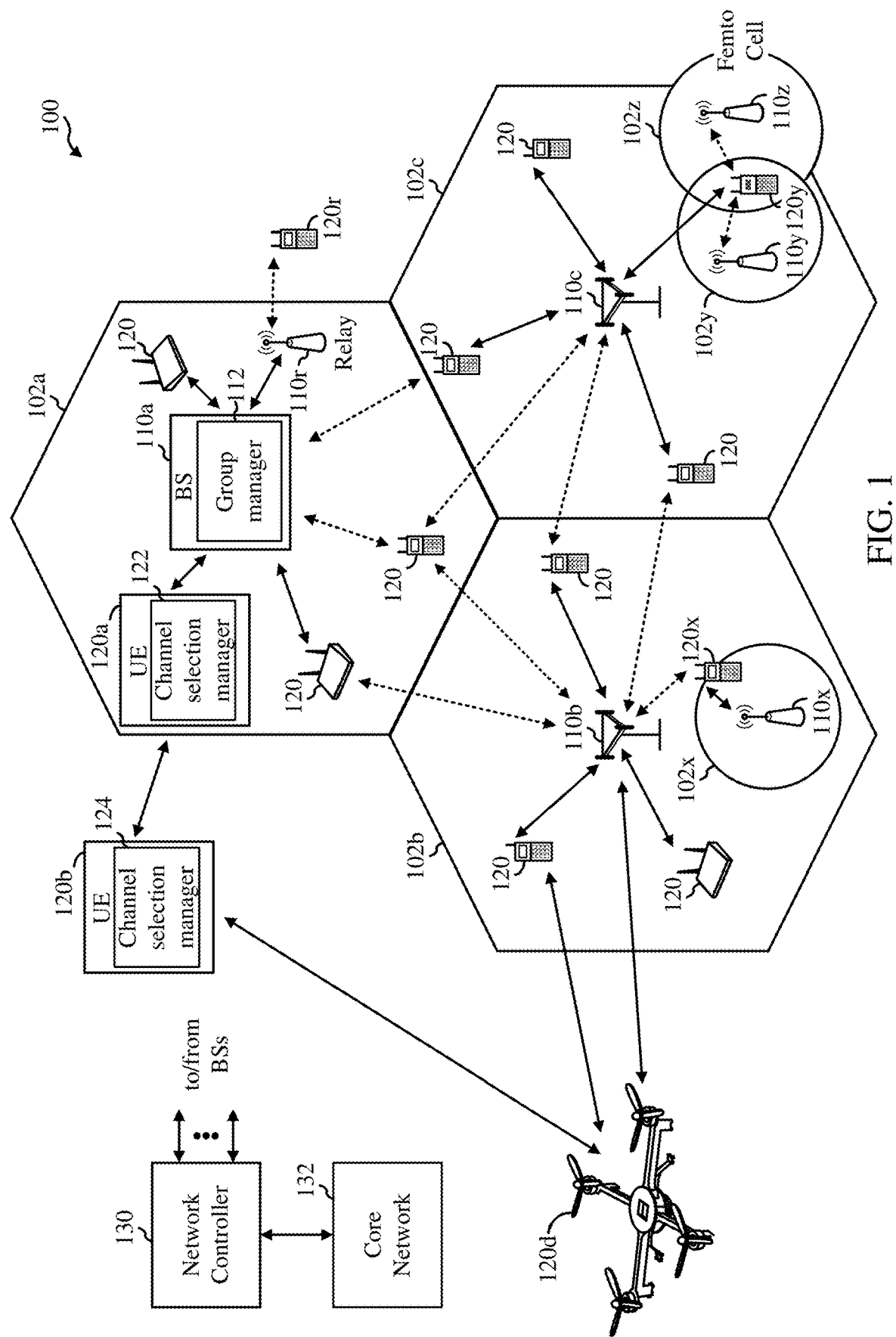
FIG. 1 is a block diagram conceptually illustrating an example wireless communication network, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more base station (BSs) 110 and/or user equipment (UE) 120 in the wireless communication network 100 via one or more interfaces.

According to certain aspects, the UEs 120 may be configured to transmit a signal in a (e.g., unlicensed) frequency band (e.g., an unlicensed channel) during a time period, referred to as a channel occupancy time (COT), for SL communication on the frequency band. The COT may have been acquired by another UE using one or more techniques, such as listen-before-talk (LBT) and by transmitting a reservation signal.

As shown in FIG. 1, the UE 120a includes a channel selection manager 122 that measures, during a time period shorter than one slot, a channel condition of at least one first channel in a sidelink (SL) frequency band. The channel selection manager 122 further transmits a signal on the at least one first channel or a second channel of the SL frequency band, wherein the at least one first channel or the second channel is chosen based on the channel condition, in accordance with aspects of the present disclosure. The UE 120b also includes a channel selection manager 124 that measures, during a time period shorter than one slot, a channel condition of at least one first channel in a SL frequency band. The channel selection manager 124 further transmits a signal on the at least one first channel or a second channel of the SL frequency band, wherein the at least one first channel or the second channel is chosen based on the channel condition, in accordance with aspects of the present disclosure. The BS 110a includes a group manager 112 that receives an indication of a channel condition of at least one first channel in a sidelink (SL) frequency band, wherein the channel condition is determined for a time period shorter than one slot. The group manager 112 further transmits a switch message to a group of user equipments (UEs) directing the group of UEs to switch to using the at least one first channel for SL communications between the UEs included in the group, in accordance with aspects of the present disclosure. It should be noted that, though not shown, another type of centralized entity (e.g., in core network 132, in network 100, outside of network 100, etc.) than the BS 110a may include a group manager 112 and perform the described functions.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. In one example, a quadcopter, drone, or any other unmanned aerial vehicle (UAV) or remotely piloted aerial system (RPAS) 120d may be configured to function as a UE. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
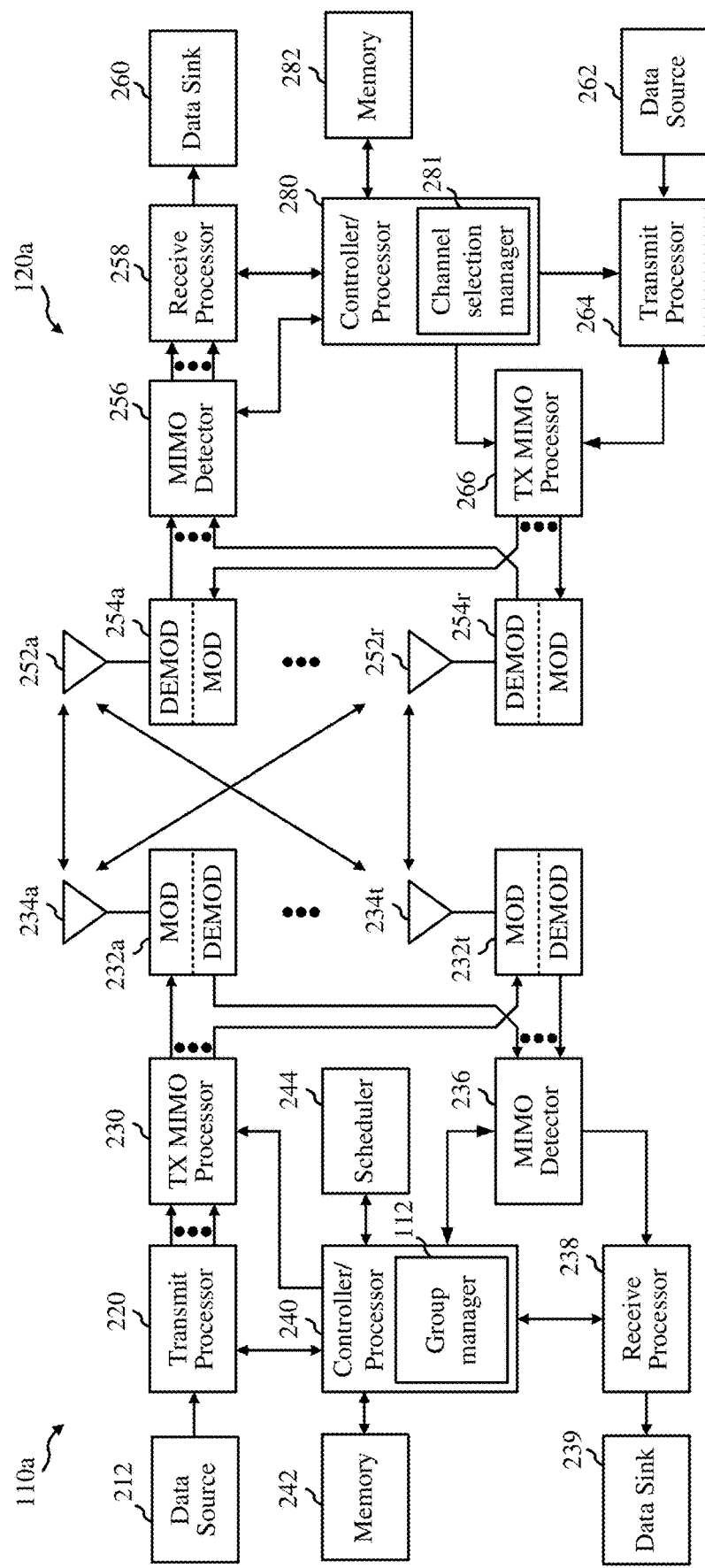
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has the described group manager 112. As shown in FIG. 2, the controller/processor 280 of the UE 120a has the channel selection manager 281, which may correspond to one or more of the channel selection manager 122 or the channel selection manager 124. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3B:
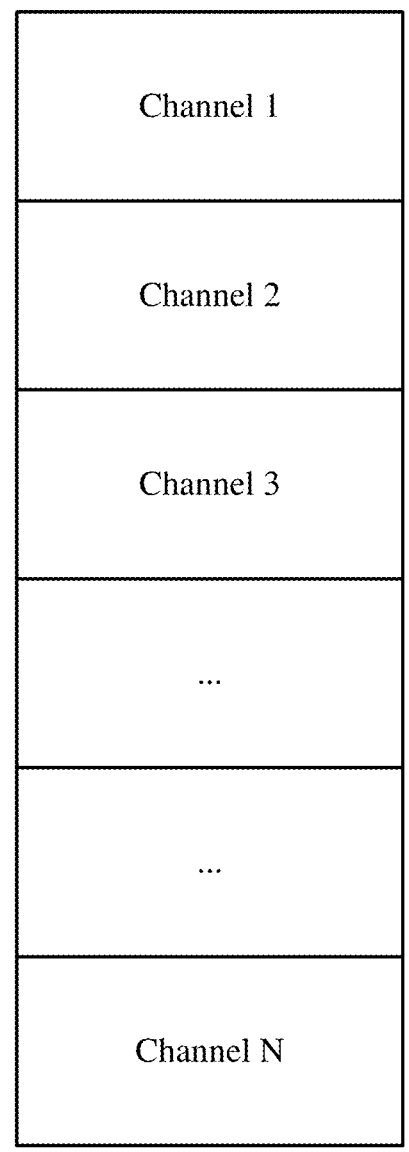
FIG. 3B is an example plurality of sidelink channels for certain wireless communication systems in accordance with certain aspects of the present disclosure.

FIG. 3A is a diagram showing an example of a frame format 300 for communication. The transmission timeline for each of the downlink and uplink may be partitioned into units of radio frames. For example, UEs may be configured to communicate (e.g., SL communications) using the frame format 300. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. As discussed, in certain aspects, a device may measure channel conditions in one or more SL frequency channels for a time period shorter than one slot to determine whether to use the one or more SL frequency channels for SL communications. For example, FIG. 3B illustrates an example SL frequency band 350. The SL frequency band 350 is divided into N SL frequency channels. Though shown having a particular number N frequency channels in FIG. 3B it should be noted that the frequency band 350 may have any suitable number of frequency channels.

Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst (e.g., referred to as an SS burst or SS burst set) where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3A. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS burst sets to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4B:
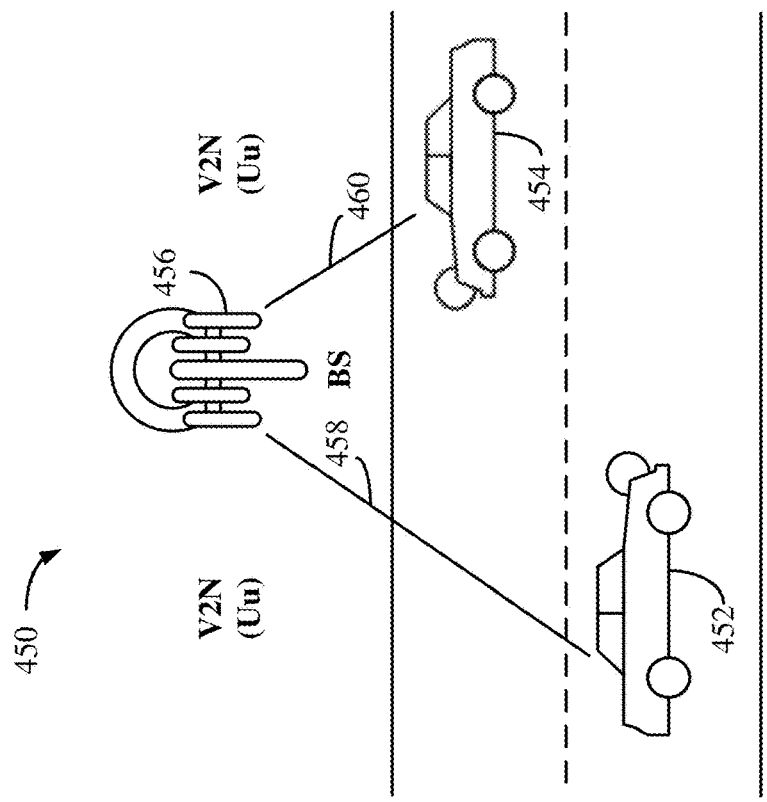
FIG. 4A and FIG. 4B show diagrammatic representations of example vehicle to everything (V2X) systems, in accordance with certain aspects of the present disclosure.
Figure 4A:
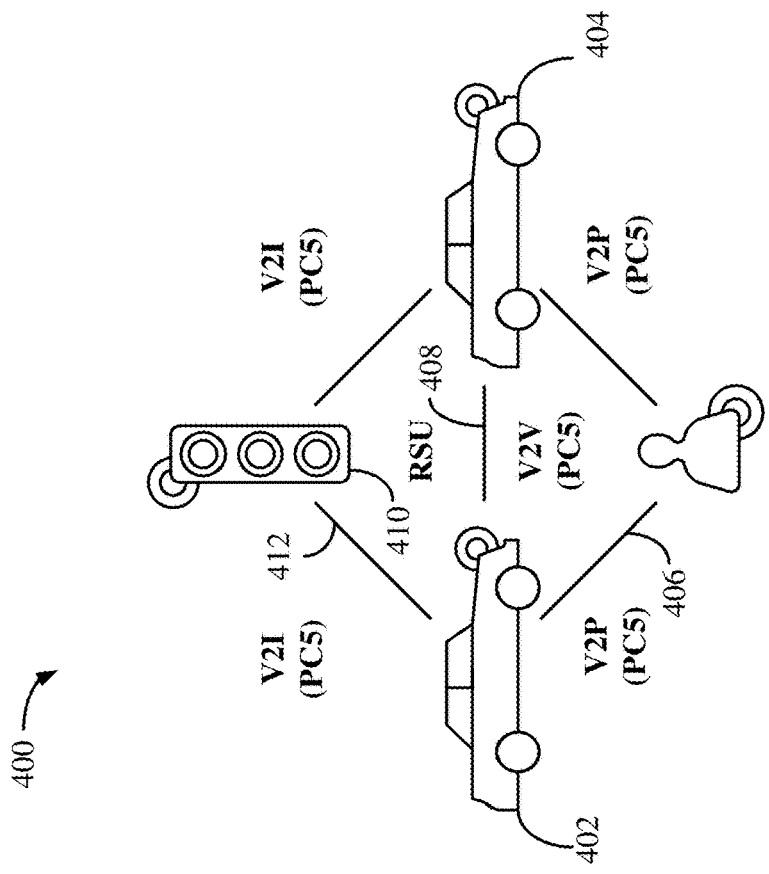

FIG. 4A and FIG. 4B show diagrammatic representations of example V2X systems, in accordance with some aspects of the present disclosure. For example, the vehicles shown in FIG. 4A and FIG. 4B may communicate via sidelink channels and may relay sidelink transmissions as described herein. The V2X systems, may be examples of SL communication systems discussed herein, and the vehicles and other devices may be configured to communicated over SL frequency channels as discussed herein.

The V2X systems provided in FIG. 4A and FIG. 4B provide two complementary transmission modes. A first transmission mode (also referred to as mode 4), shown by way of example in FIG. 4A, involves direct communications (for example, also referred to as sidelink communications) between participants in proximity to one another in a local area. A second transmission mode (also referred to as mode 3), shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle-to-vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110a), that sends and receives information to and from (for example, relays information between) vehicles 452, 454. The network communications through vehicle to network (V2N) links 458 and 460 may be used, for example, for long-range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NodeB-type RSUs have similar functionality as a Macro eNB or gNB. The Micro NodeB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Figure 5:
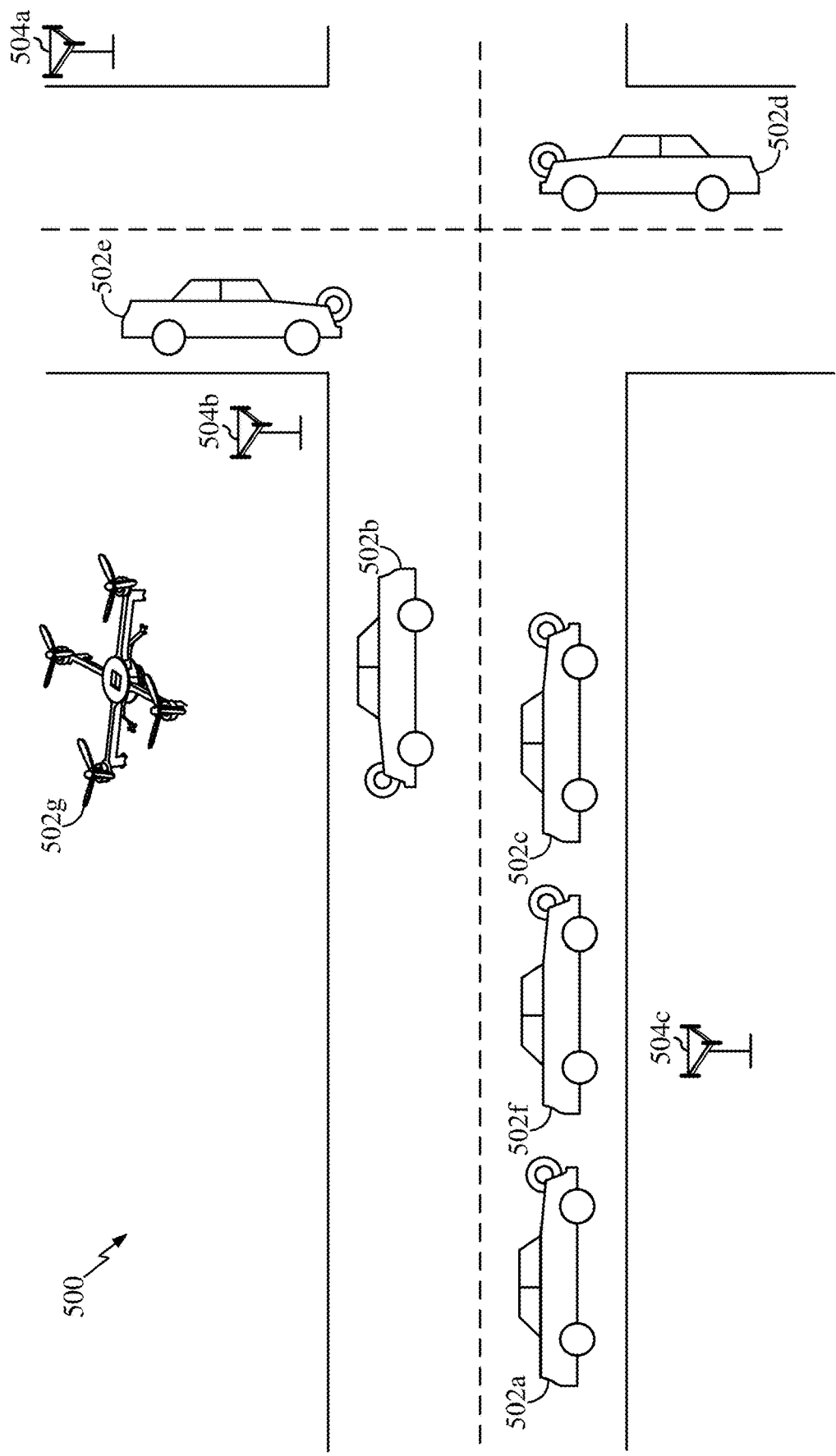
FIG. 5 is a schematic diagram illustrating an example model of multiple wireless devices operating in an unlicensed spectrum, in accordance with certain aspects of the present disclosure.

FIG. 5 is a schematic diagram illustrating an example network 500 of multiple CV2X devices operating in an unlicensed spectrum. The unlicensed spectrum may be an example of a SL frequency band. Further, the network 500 may be an example of a SL communication system. The CV2X devices 502 may be configured to communication on SL frequency channels as discussed herein. For example, any of the CV2X devices 502 may communicate with any other of the CV2X devices 502.

In the illustrated example, seven CV2X devices (e.g., a first CV2X device 502a, a second CV2X device 502b, a third CV2X device 502c, a fourth CV2X device 502d, a fifth CV2X device 502e, a sixth CV2X device 502f, and a seventh CV2X device 502g)—collectively referred to as CV2X devices 502) may operate in an unlicensed spectrum with other non-CV2X devices (e.g., non-CV2X devices 504a-c—collectively referred to as non-CV2X devices 504). In some examples, the first CV2X device 502a, the sixth CV2X device 502f, and the third CV2X device 502c may be part of a fleet or platoon. In transportation, platooning or flocking is a method for driving a group of vehicles together. It is meant to increase the capacity of roads via an automated highway system. Platoons decrease the distances between cars or trucks, such as based on SL communications.

Although the example provided is illustrative of six automotive CV2X devices in a traffic setting and a drone or other aerial vehicle CV2X device, it can be appreciated that CV2X devices and environments may extend beyond these, and include other wireless communication devices and environments. For example, the CV2X devices 502 may include UEs (e.g., UE 120 of FIG. 1) and/or road-side units (RSUs) operated by a highway authority, and may be devices implemented on motorcycles or carried by users (e.g., pedestrian, bicyclist, etc.), or may be implemented on another aerial vehicle such as a helicopter.

The CV2X devices 502 may include UEs (e.g., UE 120 of FIG. 1), and may be devices implemented on motorcycles or carried by users (e.g., pedestrian, bicyclist, etc.), or implemented as a roadside unit.

In aspects of the present disclosure, key performance indicators (KPIs) may be defined to detect the noise level of a channel (e.g., how much interference is present on the channel). For example, a channel busy ratio (CBR) may be calculated as the portion of sub-channels in a resource pool whose sidelink received signal strength indicator (S-RSSI), measured by the UE over the most recent 100 subframes, exceed a threshold (e.g., a preconfigured threshold). When a KPI for a channel reaches or surpasses a threshold, a SL device may, for example, determine to delay a transmission on that channel and/or send the transmission via a different channel.

According to certain aspects of the present disclosure, when a SL device has a transmission to send, the transmission may be shorter than a slot (e.g., a slot in an LTE communications system). Because the transmission may be shorter than a slot and interference may be shorter than a slot, the transmission may be transmitted in a portion of a slot that does not have interference over a threshold. Thus, it may be desirable for a device to measure channel conditions for short (e.g., shorter than a slot) periods of time to determine whether to use a channel for SL communications.

According to certain aspects, a SL device measures channel conditions of a SL frequency channel during a slot which is not allocated for transmission and/or reception by devices in a SL communication system (e.g., not contained in a configured pool of resources used for transmission and/or reception). The SL device may use a portion of the slot to switch from communicating on a first frequency channel to measuring a second frequency channel. The SL device may measure the frequency channel for the remaining portion of the slot, which is less than the duration of the entire slot.

In certain aspects of the present disclosure, when a SL device has a transmission to send to an intended recipient and determines to switch from a first channel to a second channel as discussed, the intended recipient may also switch to communicating on the second channel to receive the transmission.

Example Sidelink Channel Selection Coordination

Aspects of the present disclosure provide techniques and apparatus for measuring a channel condition during a period shorter than one slot. Measuring a channel condition in such a period may enable a SL device to determine a channel is available when it otherwise would not be determined available if a longer time period was measured as discussed.

Aspects of the present disclosure also provide techniques and apparatus for a group of UEs, meaning a plurality of UEs that can be signaled together as a group (e.g., sharing a group identifier), to switch or reselect to another channel, such that the group of UEs can exchange SL communications via the other channel. For example, if measurements indicate that a channel currently used for SL communications by a group of UEs has more interference than another channel, then the group of UEs may switch to the other channel and perform SL communications with less interference, which may enable the SL communications to have higher throughput.

According to aspects of the present disclosure, sensing and collection by a device of channel conditions of a same channel (e.g., same as a channel used for current communications) or other channels may be performed over short durations. For example, a device may determine a received signal strength indication (RSSI) or a reference signal received power (RSRP) over a time period shorter than one slot.

In aspects of the present disclosure, a device may maintain a list of channels that the device does not measure (e.g., an exclusion list), because the device does not expect to transmit on those channels. For example, the device may have encountered consistent interference (e.g., from a Wi-Fi network or a radar) on a channel for an extended period of time and added that channel to a list of channels on which to avoid transmitting.

According to aspects of the present disclosure, a device may maintain a list of channels that the device measures and attempts to transmit on (e.g., an inclusion list). The device may rotate measurement and transmission among the channels of the list.

In aspects of the present disclosure, a device may filter measurements of channels while taking aging of the measurements into account. For example, a device may assign a coefficient (e.g., a) to each measurement that the device has determined, with the coefficients related to each measurement's age. In the example, the device may determine a condition of the channel by calculating a weighted average of measurements and associated coefficients for the channel. For example, if a device measures RSSI values $RSSI_A$, $RSSI_B$, and $RSSI_C$, at times A, B, and C, then the device may assign coefficients $\alpha_A$, $\alpha_B$, and $\alpha_C$ to $RSSI_A$, $RSSI_B$, and $RSSI_C$, respectively. In the example, $\alpha_A$ may be 0.1, $\alpha_B$ may be 0.3, and $\alpha_C$ may be 0.6. Still in the example, the device may calculate the weighted average $RSSI_w$ according to the below formula:

$$RSSI_w = \frac{\alpha_A RSSI_A + \alpha_B RSSI_B + \alpha_C RSSI_C}{\alpha_A + \alpha_B + \alpha_C}$$

$$RSSI_w = 0.1 \times RSSI_A + 0.3 \times RSSI_B + 0.6 \times RSSI_C$$

According to aspects of the present disclosure, a device (e.g., a UE) may switch to another channel for sidelink (SL) transmissions during vacant subframes or slots, e.g., subframes or slots when the UE is not transmitting or receiving.

In aspects of the present disclosure, a UE may autonomously select a channel for a SL transmission based on channel measurements, such as made over a short duration. A UE may, for example, select a channel for a SL transmission based on the channel having less interference than a channel the UE has previously used for SL transmissions to improve the probability that the SL transmission will be successfully received. In another example, a UE may select a new channel for a SL transmission based on a measurement of a channel the UE has previously used for SL transmissions exceeding a threshold while the measurement of the new channel does not exceed the threshold. In still another example, a UE may calculate wideband RSSI, RSSI per subchannel, and/or a channel busy ratio (CBR) from a short RSSI calculated over a short duration (e.g., shorter than a slot) and then select a channel for SL transmissions based on the wideband RSSI, RSSI per subchannel, and/or CBR.

According to aspects of the present disclosure, a UE may be configured for communication via two sidelink channels, also referred to as being configured with two sidelinks. For example, a UE may communicate one type of information/messages on a first sidelink channel and another type of information/messages on a second sidelink channel. Certain aspects are described where a first sidelink is used for safety messages, and a second sidelink is used for other messages. However, other types of information/messages may similarly be communicated on sidelinks. The two sidelinks may, for example, include a first sidelink for safety messages and a second sidelink with higher capacity that is not used for safety messages. The UE may measure a full subframe to determine RSSI on the safety sidelink before switching to using the safety sidelink. To switch to the higher capacity sidelink the UE may measure RSSI for a shorter duration (e.g., shorter than a slot) and/or determine RSRP of physical sidelink shared channels (PSSCHs) received on the higher capacity sidelink (e.g., from other UEs).

In certain aspects of the present disclosure, a device may propagate collected channel conditions to a centralized entity (CE). That is, a device may transmit a report regarding channel conditions to another device, which may be a centralized entity or which may forward the report to a centralized entity. The report may include a number of channels to which the report applies, such as one or more of, an identifier (e.g., an indication of an E-UTRA absolute radio frequency channel number (EARFCN)) for each of the channels, an identifier of an attribute (e.g., an index to a list of attributes, such as CBR or wideband RSSI), and/or a corresponding value for each attribute.

According to aspects of the present disclosure, a report regarding channel conditions may be delivered to a centralized entity via a Uu-interface transmission (e.g., a PUSCH), such as to the centralized entity directly or via another device (e.g., BS, RSU, etc.) in communication with the centralized entity. In some aspects of the present disclosure, a UE which does not have a Uu-interface connection may convey the report to another UE (e.g., via a PSSCH or as uplink control information transmitted to a relay) (also referred to as a relay UE) that has a Uu-interface connection, and the relay UE may deliver the report to the centralized entity.

In aspects of the present disclosure, the centralized entity may assign UEs to groups. For example, the centralized entity may assign UEs to groups according to a geographical characteristic of each UE, such as presence in a zone or a position of the UE. In another example, the centralized entity may group UEs based on platooning of the UEs or according to some mobility characteristic (e.g., speed and/or direction of travel) of the UE or a vehicle transporting the UE.

According to aspects of the present disclosure, the centralized entity may assign each group of UEs to a channel selected based on reported attributes (e.g., reported by the UEs, as described herein) of the channel.

In aspects of the present disclosure, the centralized entity may send commands to the group (meaning all UEs in the group) to switch (e.g., to reselect) to another channel when the centralized entity determines that switching the group to the other channel may cause an improvement of a channel attribute (e.g., reduced interference) for the group.

According to aspects of the present disclosure, if multiple groups may experience a similar or same improvement of a channel improvement by being switched into the same channel, the centralized entity may determine which group to switch to the channel based on other considerations, such as message priorities (e.g., safety messages or non-safety messages) of the groups or sizes of the groups.

In certain aspects of the present disclosure, a device (e.g., a centralized entity or a UE) may use a minimum margin when comparing attributes to determine whether to switch the device or a group to a channel with a better attribute, so that a hysteresis effect prevents the device or group from switching channels for attribute improvements that are below the minimum margin. Preventing switches of channels for attribute improvements below the minimum margin may prevent a "ping-pong" effect of a device or group rapidly switching channels due to small changes in channel conditions. For example, a UE may be configured with a minimum margin of X (e.g., 0.05) for channel busy ratio (CBR) for determining whether to switch SL channels. In the example, the UE may be using channel A for SL communications, and the UE may measure channel A as having a CBR of Y (e.g., 0.45). In the example, the UE may measure channel B as having a CBR of Z (e.g., 0.42). The UE may determine not to switch to channel B for SL communications despite the CBR of channel B being better than the CBR of channel A, because the difference between the CBR of channel A and the CBR of channel B is smaller than the minimum margin of X, e.g., 0.45−0.42=0.03<0.05.

According to aspects of the present disclosure, when a centralized entity determines to switch a group to a new channel, the centralized entity may send a switch message to the group of UEs with an indication of a time when the group is to switch to the new channel. In certain aspects, the indication of the time may be a direct frame number (DFN), which indicates a particular frame, and the group of UEs may switch to the new channel for communications starting at the frame indicated by the direct frame number.

In aspects of the present disclosure, a switch message may be propagated in a manner similar to a manner of propagating channel reports. For example, a switch message from a base station may be sent to a UE via a Uu-interface message (e.g., a PDSCH), and the switch message may be propagated to other UEs via PSSCHs or uplink control information (UCI).

According to aspects of the present disclosure, when a group of UEs switches to a new channel, each UE in the group may drop a current semi-persistent schedule (SPS) configuration for transmissions on the old channel and start a new SPS configuration for transmissions on the new channel. Semi-persistent scheduling is a technique in which a device (e.g., a UE) schedules or is scheduled to transmit or receive on a recurring basis for an extended period of time (e.g., until a currently-used SPS configuration is dropped). By using SPS, a device may be able to save transmission resources used for control channels by repeatedly transmitting or receiving without each transmission or reception being scheduled by a separate control channel. An SPS configuration may schedule transmissions or receptions to avoid interference that occurs on a repeating basis (e.g., radar transmissions). When a group of UEs switches to a new channel, any UE in the group using an SPS configuration may drop a current SPS configuration for transmissions on the old channel and start a new SPS configuration for transmissions on the new channel because the interference environment of the new channel may be different than the interference environment of the old channel, with different repeated interference.

Figure 6:
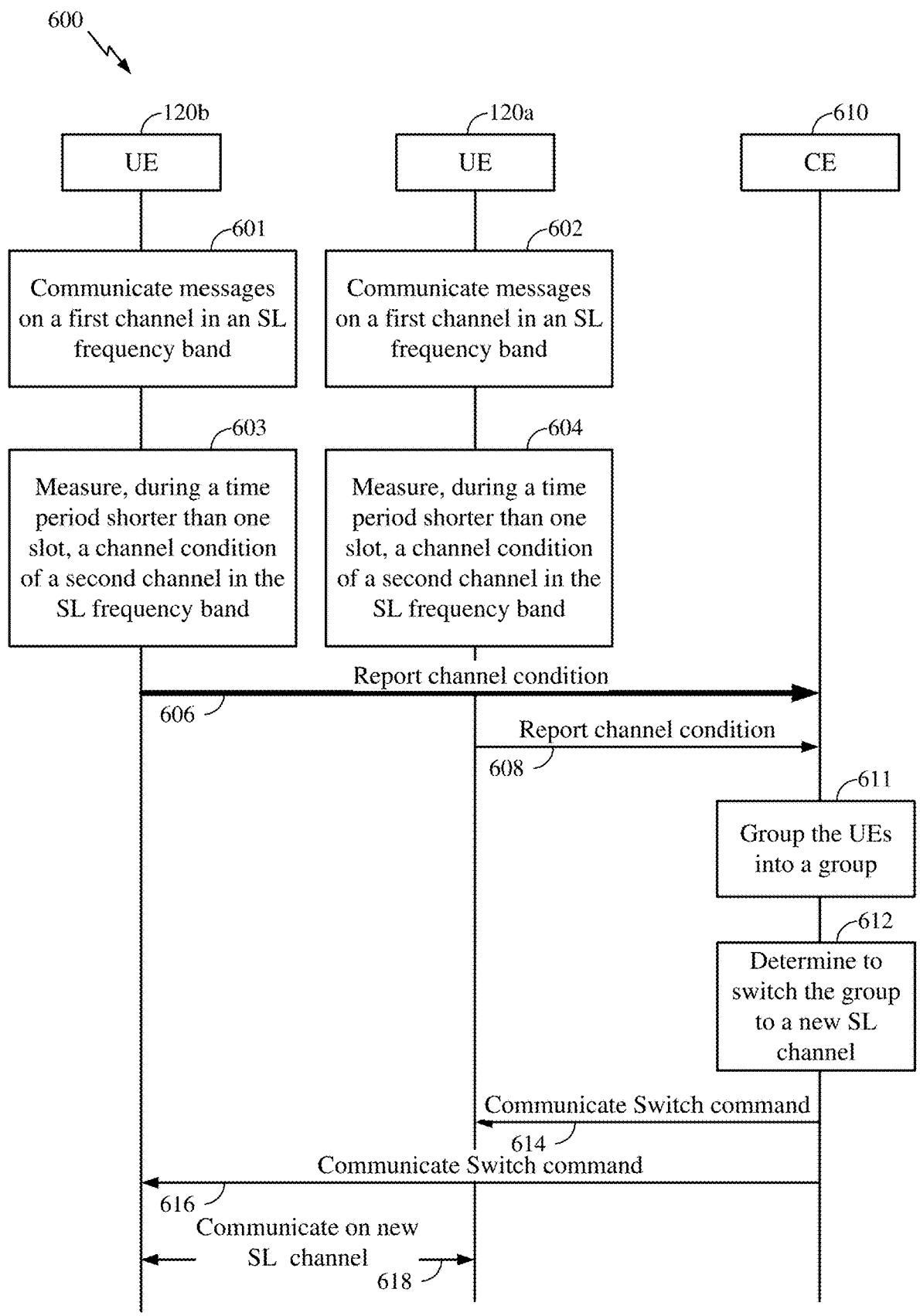
FIG. 6 is a call flow diagram illustrating example signaling for SL channel selection coordination, in accordance with aspects of the present disclosure.

FIG. 6 is a call flow diagram 600 illustrating example signaling for SL channel selection coordination, in accordance with aspects of the present disclosure. The call flow diagram 600 illustrates example signaling between a centralized entity (CE) 610, a UE 120*a*, and a UE 120*b*.

At 601, UE 120*b* communicates messages on a first channel in an SL frequency band. At 602, UE 120*a* communicates messages on the first channel. Though 601 and 602 are shown occurring at approximately the same time, in another example, they may occur at different times.

At 603, UE 120b measures, during a time period shorter than one slot, a channel condition of a second channel in the SL frequency band. At 604, UE 120a measures, during a period shorter than one slot, a channel condition of the second channel. Though 603 and 604 are shown occurring at approximately the same time, in another example, they may occur at different times.

As indicated, UE 120b, between 601 and 603 (and similarly UE 120a between 602 and 604), switches from communicating on the first channel to measuring on the second channel. In certain aspects, after measuring (e.g., and before 606 and/or 608) UE 120b switches from measuring on the second channel to communicating on the first channel. In certain aspects, UE 120b performs the switching and/or measuring on a vacant subframe or slot (e.g., unused for communication on the first channel, such as according to a pool configuration, a side link synchronization signal subframe, a reserved subframe, etc.). The time it takes for a UE to switch from communicating on the first channel to measuring on the second channel may be $T_{switch}$. The time a UE measures the second channel may be $T_{measure}$. The time it takes for a UE to switch from measuring on the second channel to communicating on the first channel may also be $T_{switch}$. Therefore, in certain aspects, to ensure all the switching and measuring occurs in a slot time:

$$T_{switch} + T_{measure} + T_{switch} \le \text{slot time, meaning}$$
$$T_{measure} < \text{slot time.}$$

At 606, UE 120b reports the channel condition to the CE 610, such as via a Uu-interface transmission. At 608, UE 120a reports the channel condition to the CE 610, such as via a Uu-interface transmission. In certain aspects, the UE 120b may indirectly report channel conditions via UE 120a. At 611, the CE 610 groups UE 120a and UE 120b into a group. In certain aspects, CE 610 may have grouped the UEs into a group prior to receiving the report. At 612, the CE 610 decides to switch the group to a new SL channel. For example, the BS may determine that channel conditions for a different channel than the group is currently using for communications are better (e.g., by a threshold, minimum margin, etc.) and switch the group to the different channel. In one example, the group may have been communicating on Channel 1 of frequency band 350 of FIG. 3B and switch to communicating on Channel 2 of frequency band 350 of FIG. 3B. At 614, the CE 610 transmits signaling commanding the UE 120a to switch to the new SL channel during a time period (e.g., a frame indicated by a DFN). At 616, the CE 610 transmits signaling commanding the UE 120b to switch to the new SL channel during the time period. In certain aspects, though not shown, the UE 120b may indirectly receive the signaling from the CE 610 via UE 120a. At 618, when the indicated time occurs, the UEs communicate on the new SL channel.

Figure 7:
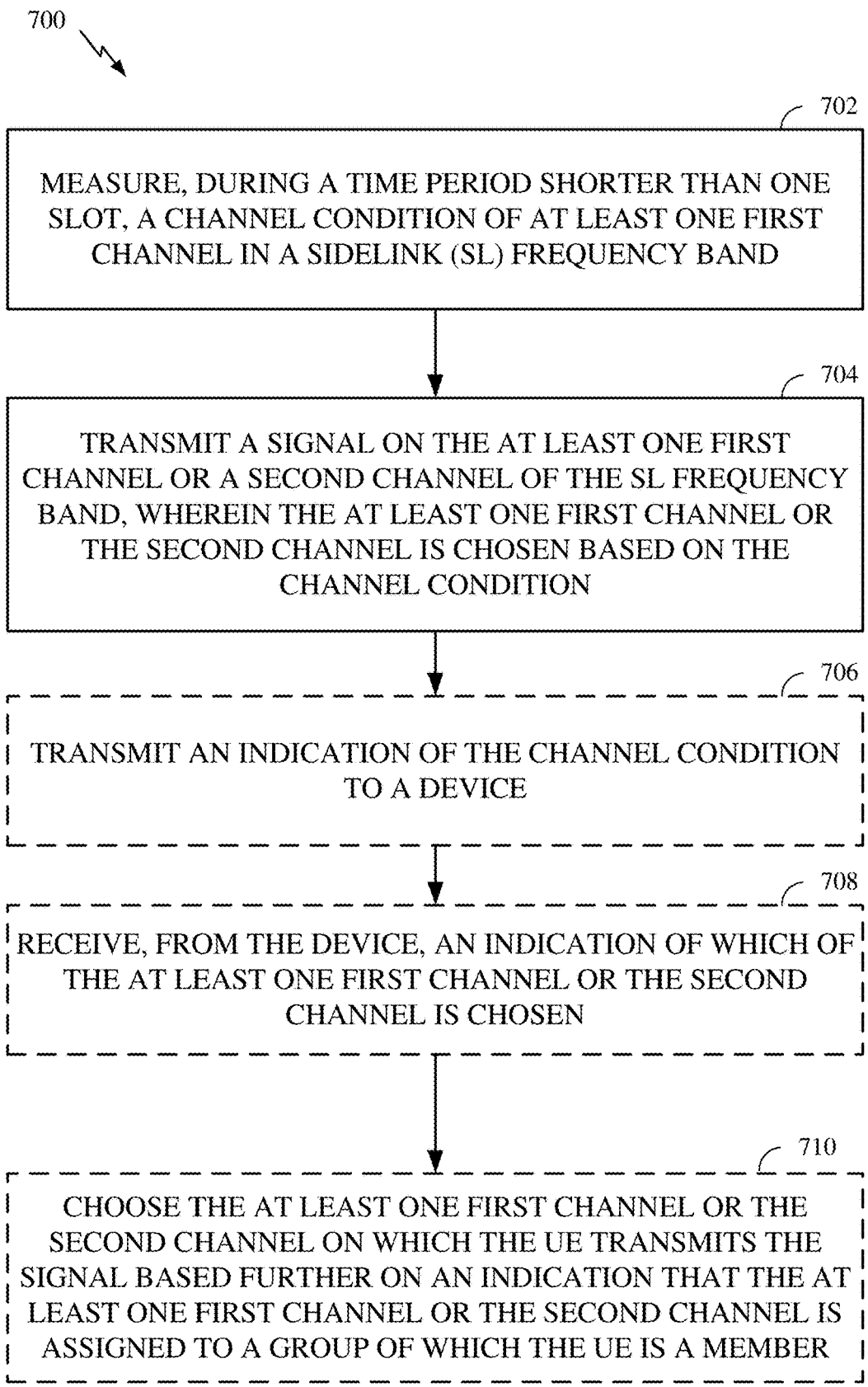
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (e.g., such as the UE 120a in the wireless communication network 100). The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 702, by measuring, during a time period shorter than one slot, a channel condition of at least one first channel in a sidelink (SL) frequency band.

Operations 700 may continue, at block 704, by transmitting a signal on the at least one first channel or a second channel of the SL frequency band, wherein the at least one first channel or the second channel is chosen based on the channel condition.

At block 706, operations 700 optionally continue by transmitting an indication of the channel condition to a device.

Operations 700 optionally continue at block 708 by receiving, from the device, an indication of which of the at least one first channel or the second channel is chosen.

At block 710, operations 700 optionally continue by choosing the at least one first channel or the second channel on which the UE transmits the signal further based on an indication that the at least one first channel or the second channel is assigned to a group of which the UE is a member.

Figure 8:
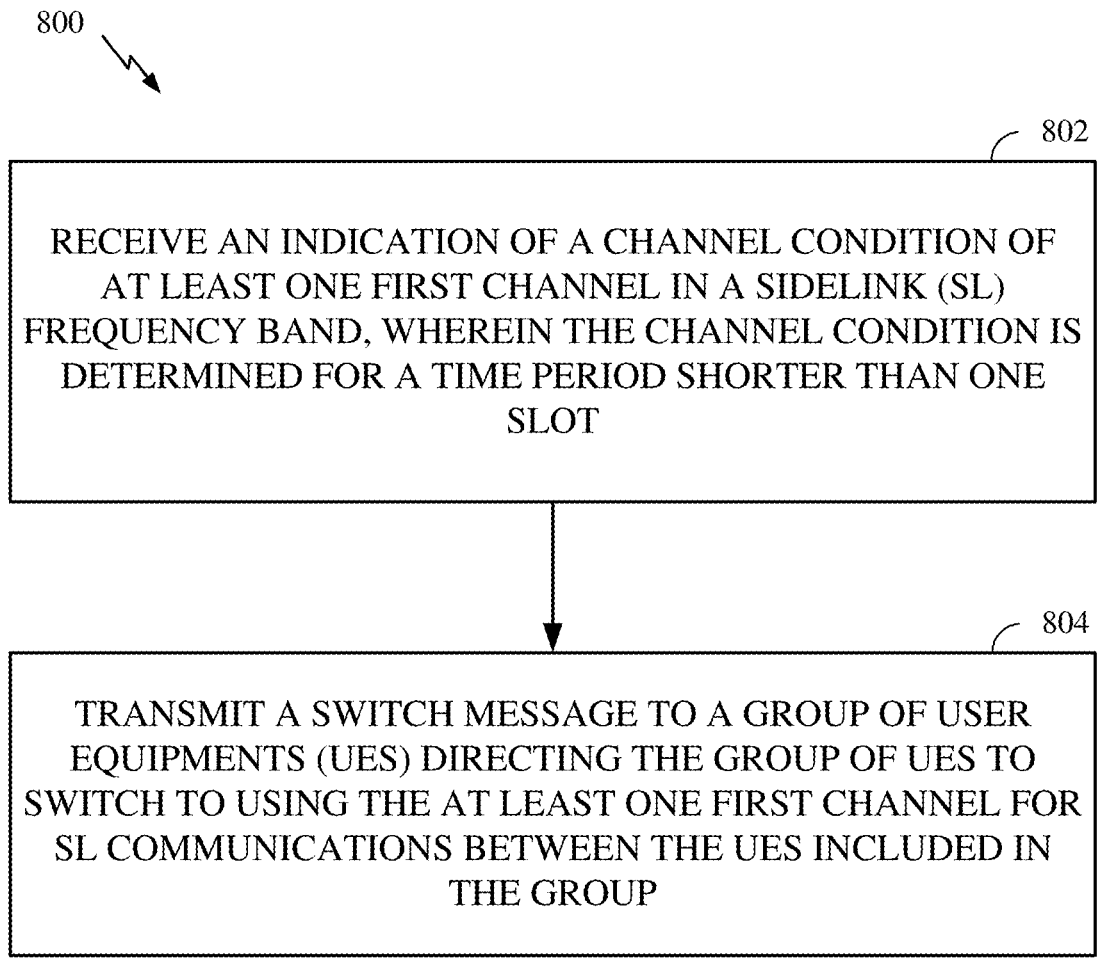
FIG. 8 is a flow diagram illustrating example operations for wireless communication by a centralized entity, in accordance with certain aspects of the present disclosure.

FIG. 8 is a flow diagram illustrating example operations 800 for wireless communication, in accordance with certain aspects of the present disclosure. The operations 800 may be performed, for example, by a centralized entity (e.g., such as the BS 110a in the wireless communication network 100). The operations 800 may be complementary to the operations 700 performed by the UE. The operations 800 may be implemented as software components that are executed and run on one or more processors (e.g., controller/processor 240 of FIG. 2). Further, the transmission and reception of signals by the centralized entity in operations 800 may be enabled, for example, by one or more antennas (e.g., antennas 234 of FIG. 2). In certain aspects, the transmission and/or reception of signals by the centralized entity may be implemented via a bus interface of one or more processors (e.g., controller/processor 240) obtaining and/or outputting signals.

The operations 800 may begin, at block 802, by receiving an indication of a channel condition of at least one first channel in a sidelink (SL) frequency band, wherein the channel condition is determined for a time period shorter than one slot.

At block 804, operations 800 may continue by transmitting a switch message to a group of user equipments (UEs) directing the group of UEs to switch to using the at least one first channel for SL communications between the UEs included in the group.

Figure 9:
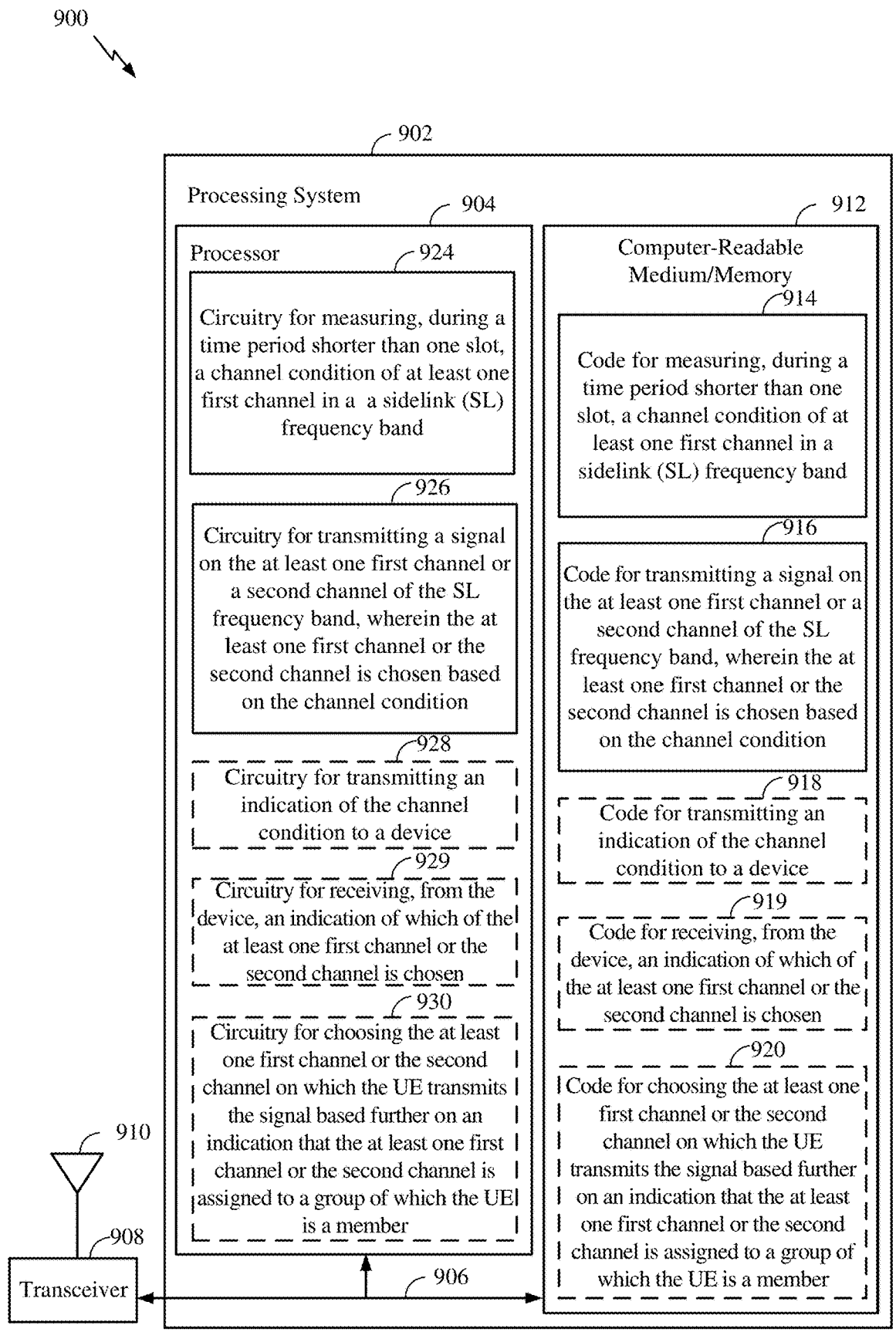
FIG. 9 illustrates a communications device that may include various components configured to perform the operations illustrated in FIG. 7, in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein for SL channel selection coordination. In certain aspects, computer-readable medium/memory 912 stores code 914 for measuring, during a time period shorter than one slot, a channel condition of at least one first channel in a sidelink (SL) frequency band; code 916 for transmitting a signal on the at least one first channel or a second channel of the SL frequency band, wherein the at least one first channel or the second channel is chosen based on the channel condition; optional code 918 for transmitting an indication of the channel condition to a device; optional code 919 for receiving, from the device, an indication of which of the at least one first channel or the second channel is chosen; and optional code 920 for choosing the at least one first channel or the second channel on which the UE transmits the signal further based on an indication that the at least one first channel or the second channel is assigned to a group of which the UE is a member. In certain aspects, the processor 904 has circuitry configured to implement the code stored in the computer-readable medium/memory 912. The processor 904 includes circuitry 924 for measuring, during a time period shorter than one slot, a channel condition of at least one first channel in a sidelink (SL) frequency band; circuitry 926 for transmitting a signal on the at least one first channel or a second channel of the SL frequency band, wherein the at least one first channel or the second channel is chosen based on the channel condition; optional circuitry 928 for transmitting an indication of the channel condition to a device; optional circuitry 929 for receiving, from the device, an indication of which of the at least one first channel or the second channel is chosen, and optional circuitry 930 for choosing the at least one first channel or the second channel on which the UE transmits the signal further based on an indication that the at least one first channel or the second channel is assigned to a group of which the UE is a member.

For example, means for transmitting (or means for outputting for transmission) may include a transmitter and/or an antenna(s) 234 or the BS 110a or the transmitter unit 254 and/or antenna(s) 252 of the UE 120a illustrated in FIG. 2, circuitry 926 for transmitting a signal on the at least one first channel or a second channel of the SL frequency band, wherein the at least one first channel or the second channel is chosen based on the channel condition, and/or circuitry 928 for transmitting an indication of the channel condition to a device of the communication device 900 in FIG. 9. Means for receiving (or means for obtaining or means for measuring) may include a receiver and/or an antenna(s) 234 of the BS 110a or a receiver and/or antenna(s) 252 of the UE 120a illustrated in FIG. 2 and/or circuitry 929 for receiving, from the device, an indication of which of the at least one first channel or the second channel is chosen of the communication device 900 in FIG. 9. Means for communicating may include a transmitter, a receiver or both. Means for generating, means for performing, means for determining, means for taking action, means for determining, means for coordinating, and means for measuring may include a processing system, which may include one or more processors, such as the transmit processor 220, the TX MIMO processor 230, the receive processor 238, and/or the controller/processor 240 of the BS 110a or the receive processor 258, the transmit processor 264, the TX MIMO processor 266, and/or the controller/processor 280 of the UE 120a illustrated in FIG. 2 and/or the processing system 902 of the communication device 900 in FIG. 9.

Figure 10:
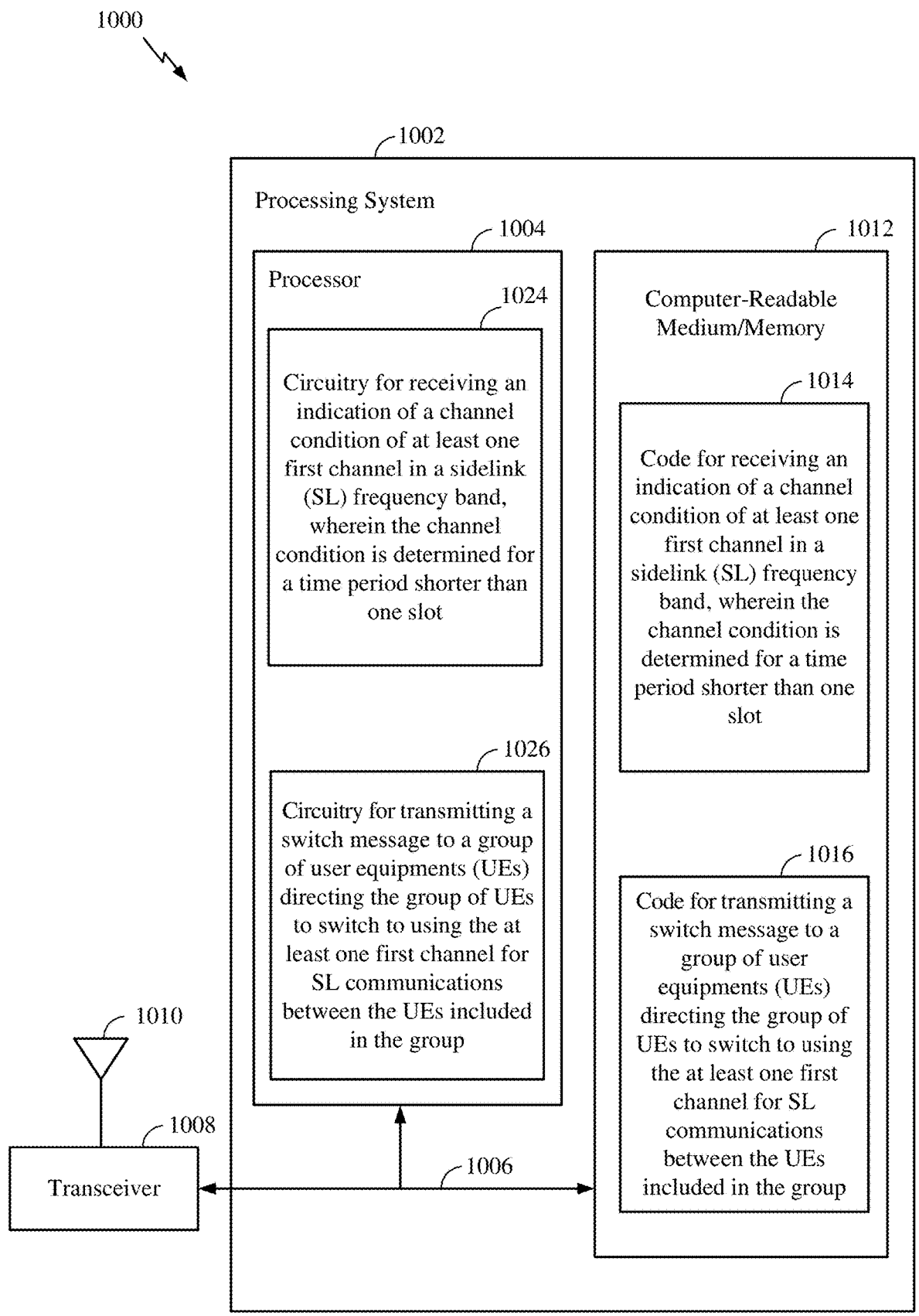
FIG. 10 illustrates a communications device that may include various components configured to perform the operations illustrated in FIG. 8, in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for SL channel selection coordination. In certain aspects, computer-readable medium/memory 1012 stores code 1014 for receiving an indication of a channel condition of at least one first channel in a sidelink (SL) frequency band, wherein the channel condition is determined for a time period shorter than one slot; and code 1016 for transmitting a switch message to a group of user equipments (UEs) directing the group of UEs to switch to using the at least one first channel for SL communications between the UEs included in the group. In certain aspects, the processor 1004 has circuitry configured to implement the code stored in the computer-readable medium/memory 1012. The processor 1004 includes circuitry 1024 for receiving an indication of a channel condition of at least one first channel in a sidelink (SL) frequency band, wherein the channel condition is determined for a time period shorter than one slot; and circuitry 1026 for transmitting a switch message to a group of user equipments (UEs) directing the group of UEs to switch to using the at least one first channel for SL communications between the UEs included in the group.

For example, means for transmitting (or means for outputting for transmission) may include a transmitter and/or an antenna(s) 234 or the BS 110a or the transmitter unit 254 and/or antenna(s) 252 of the UE 120a illustrated in FIG. 2 and/or circuitry 1026 for transmitting a switch message to a group of user equipments (UEs) directing the group of UEs to switch to using the at least one first channel for SL communications between the UEs included in the group of the communication device 1000 in FIG. 10. Means for receiving (or means for obtaining) may include a receiver and/or an antenna(s) 234 of the BS 110a or a receiver and/or antenna(s) 252 of the UE 120a illustrated in FIG. 2 and/or circuitry 1024 for receiving an indication of a channel condition of at least one first channel in a sidelink (SL) frequency band, wherein the channel condition is determined for a time period shorter than one slot of the communication device 1000 in FIG. 10. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a or the receive processor 258, the transmit processor 264, the TX MIMO processor 266, and/or the controller/ processor 280 of the UE 120a illustrated in FIG. 2 and/or the processing system 1002 of the communication device 1000 in FIG. 10.

EXAMPLE ASPECTS

Implementation examples are described in the following numbered clauses:

Aspect 1. A method for wireless communication performed by a user equipment (UE), comprising: measuring, during a time period shorter than one slot, a channel condition of at least one first channel in a a sidelink (SL) frequency band; and transmitting a signal on the at least one first channel or a second channel of the SL frequency band, wherein the at least one first channel or the second channel is chosen based on the channel condition.

Aspect 2. The method of aspect 1, wherein the at least one first channel is measured based on the at least one first channel being included in an inclusion list of channels.

Aspect 3. The method of any of aspects 1 and 2, wherein the at least one first channel is measured instead of a third channel based on the third channel being included in an exclusion list of channels.

Aspect 4. The method of any of aspects 1-3, wherein the at least one first channel is measured based on an elapsed time since previously measuring the at least one first channel.

Aspect 5. The method of any of aspects 1-4, wherein the at least one first channel or the second channel is chosen further based on an age of the measurement of the at least one first channel or an age of a measurement of the second channel.

Aspect 6. The method of any of aspects 1-5, further comprising: transmitting an indication of the channel condition to a device.

Aspect 7. The method of aspect 6, further comprising: receiving, from the device, an indication of which of the at least one first channel or the second channel is chosen.

Aspect 8. The method of any of aspects 6-7, wherein transmitting the indication of the channel condition to the device comprises at least one of transmitting an identifier of the at least one first channel, an identifier of an attribute of the channel condition, or a corresponding value of the channel condition.

Aspect 9. The method of any of aspects 6-8, wherein transmitting the indication of the channel condition to the device comprises transmitting the indication of the channel condition to a relay UE.

Aspect 10. The method of any of aspects 1-9, further comprising: choosing the at least one first channel or the second channel on which the UE transmits the signal further based on an indication that the at least one first channel or the second channel is assigned to a group of which the UE is a member.

Aspect 11. The method of any of aspects 1-9, wherein the UE chooses the at least one first channel or the second channel on which the UE transmits the signal further based on a second time period during which the UE has previously transmitted on the at least one first channel or the second channel.

Aspect 12. The method of any of aspects 1-11, wherein the channel condition comprises a received signal strength indication (RSSI).

Aspect 13. A method for wireless communications performed by a centralized entity, comprising: receiving an indication of a channel condition of at least one first channel in a sidelink (SL) frequency band, wherein the channel condition is determined for a time period shorter than one slot; and transmitting a switch message to a group of user equipments (UEs) directing the group of UEs to switch to using the at least one first channel for SL communications between the UEs included in the group.

Aspect 14. The method of aspect 13, wherein the switch message comprises a direct frame number (DFN) associated with a second time period for the group of UEs to perform the switch.

Aspect 15. An apparatus comprising means for performing the method of any of aspects 1 through 14.

Aspect 16. An apparatus comprising at least one processor and a memory coupled to the at least one processor, the memory and the processor configured to perform the method of any of aspects 1 through 14.

Aspect 17. A computer readable medium storing computer executable code thereon for wireless communications that, when executed by at least one processor, cause an apparatus to perform the method of any of aspects 1 through 14.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

What is claimed is:

1. A method for wireless communications performed by a user equipment (UE), comprising:
    measuring, during a time period shorter than one slot, a channel condition of at least one first channel in a sidelink (SL) frequency band; and
    transmitting a signal on the at least one first channel or a second channel of the SL frequency band, wherein the at least one first channel or the second channel is chosen based on the channel condition;
    wherein the UE chooses the at least one first channel or the second channel on which the UE transmits the signal further based on a second time period during which the UE has previously transmitted on the at least one first channel or the second channel.

2. The method of claim 1, wherein the at least one first channel is measured based on the at least one first channel being included in an inclusion list of channels.

3. The method of claim 1, wherein the at least one first channel is measured instead of a third channel based on the third channel being included in an exclusion list of channels.

4. The method of claim 1, wherein the at least one first channel is measured based on an elapsed time since previously measuring the at least one first channel.

5. The method of claim 1, wherein the at least one first channel or the second channel is chosen further based on an age of the measurement of the at least one first channel or an age of a measurement of the second channel.

6. The method of claim 1, further comprising:
transmitting an indication of the channel condition to a device.

7. The method of claim 6, further comprising:
receiving, from the device, an indication of which of the at least one first channel or the second channel is chosen.

8. The method of claim 6, wherein transmitting the indication of the channel condition to the device comprises transmitting at least one of an identifier of the at least one first channel, an identifier of an attribute of the channel condition, or a corresponding value of the channel condition.

9. The method of claim 6, wherein transmitting the indication of the channel condition to the device comprises transmitting the indication of the channel condition to a relay UE.

10. The method of claim 1, further comprising:
choosing the at least one first channel or the second channel on which the UE transmits the signal further based on an indication that the at least one first channel or the second channel is assigned to a group of which the UE is a member.

11. The method of claim 1, wherein the channel condition comprises a received signal strength indication (RSSI).

12. An apparatus comprising:
a memory; and
a processor coupled to the memory, the memory and the processor configured to:
measure, during a time period shorter than one slot, a channel condition of at least one first channel in a sidelink (SL) frequency band; and
transmit a signal on the at least one first channel or a second channel of the SL frequency band, wherein the at least one first channel or the second channel is chosen based on the channel condition;
wherein the memory and the processor are configured to choose the at least one first channel or the second channel on which the processor transmits the signal further based on a second time period during which the apparatus has previously transmitted on the at least one first channel or the second channel.

13. The apparatus of claim 12, wherein the memory and the processor are further configured to measure the at least one first channel based on the at least one first channel being included in an inclusion list of channels.

14. The apparatus of claim 12, wherein the memory and the processor are further configured to measure the at least one first channel instead of a third channel based on the third channel being included in an exclusion list of channels.

15. The apparatus of claim 12, wherein the memory and the processor are further configured to measure the at least one first channel based on an elapsed time since previously measuring the at least one first channel.

16. The apparatus of claim 12, wherein the at least one first channel or the second channel is chosen further based on an age of the measurement of the at least one first channel or an age of a measurement of the second channel.

17. The apparatus of claim 12, wherein the memory and the processor are further configured to:
transmit an indication of the channel condition to a device.

18. The apparatus of claim 17, wherein the memory and the processor are further configured to:
receive, from the device, an indication of which of the at least one first channel or the second channel is chosen.

19. The apparatus of claim 17, wherein the memory and the processor being configured to transmit the indication of the channel condition to the device includes the memory and the processor being configured to transmit at least one of an identifier of the at least one first channel, an identifier of an attribute of the channel condition, or a corresponding value of the channel condition.

20. The apparatus of claim 17, wherein the memory and the processor being configured to transmit the indication of the channel condition to the device includes the memory and the processor being configured to transmit the indication of the channel condition to a relay user equipment (UE).

21. The apparatus of claim 12, wherein the memory and the processor are further configured to:
choose the at least one first channel or the second channel on which the memory and the processor are configured to transmit the signal further based on an indication that the at least one first channel or the second channel is assigned to a group of which the apparatus is a member.

22. The apparatus of claim 12, wherein the channel condition comprises a received signal strength indication (RSSI).

\* \* \* \* \*